United States Patent
Lee et al.

(10) Patent No.: US 7,969,687 B2
(45) Date of Patent: Jun. 28, 2011

(54) MAGNETIC HEAD WITH DELAYED CONNECTION HEATER SHUNTING

(75) Inventors: Edward Hin Pong Lee, San Jose, CA (US); David John Seagle, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 643 days.

(21) Appl. No.: 12/124,997

(22) Filed: May 21, 2008

(65) Prior Publication Data

US 2009/0290259 A1 Nov. 26, 2009

(51) Int. Cl.
G11B 15/10 (2006.01)
(52) U.S. Cl. .................................................. 360/234.5
(58) Field of Classification Search ............... 360/234.5, 360/235.4, 236.5, 236.6, 234.6, 235.6, 245.5, 360/235.7, 235.1
See application file for complete search history.

(56) References Cited

U.S. PATENT DOCUMENTS

| | | | |
|---|---|---|---|
| 6,687,097 B1 | 2/2004 | Anderson et al. | 360/323 |
| 7,061,727 B2* | 6/2006 | Hoshino et al. | 360/320 |
| 7,190,556 B2 | 3/2007 | Zhu | 360/319 |
| 7,239,488 B2 | 7/2007 | Zhu et al. | 360/323 |
| 7,291,279 B2 | 11/2007 | Dill et al. | 216/22 |
| 7,589,936 B1* | 9/2009 | McFadyen et al. | 360/123.1 |
| 2005/0285526 A1* | 12/2005 | Moon et al. | 313/582 |
| 2007/0247753 A1 | 10/2007 | Takahashi et al. | 360/126 |
| 2007/0258171 A1 | 11/2007 | Ohtsu | 360/326 |

* cited by examiner

Primary Examiner — Allen T Cao
(74) Attorney, Agent, or Firm — Zilka-Kotab, PC

(57) ABSTRACT

A slider structure that allows a grounded heater element to be employed, while also allowing a decision of whether the slider is to be an "up" slider or a "down" slider to be made in a late stage in the formation of the slider. The slider includes electrical contact pads for making electrical connection with the heater element. The slider also includes a dedicated ground path formed on the slider body at a location that is removed from either of the first and second contact pads, ground path providing electrical connectivity to the slider body. At a late stage in the manufacture of the read and write head, a determination can be made as to which contact pad is to be a ground pad, and that pad can be electrically connected with the ground path.

20 Claims, 7 Drawing Sheets

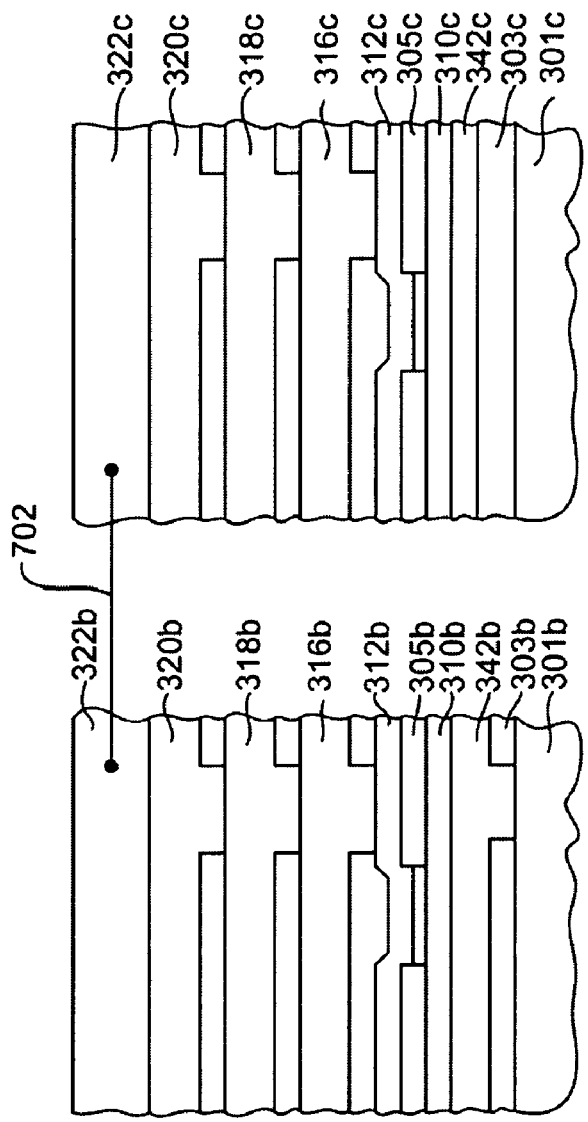

MAGNETIC HEAD WITH DELAYED CONNECTION HEATER SHUNTING

FIELD OF THE INVENTION

The present invention relates to magnetic sliders for magnetic data recording, and more particularly to the manufacture of a slider having a grounded heater element.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a slider for magnetic recording that includes a slider body, having an end surface; a magnetic head formed on the slider body; a heater element formed on the slider body; first and second heater element lead pads formed on the slider body, each of the first and second heater element lead pads being connected with a portion of the heater element; and an up/down neutral ground connection, located on the end surface of the slider body at a location removed from the first and second heater element lead pads, the up/down neutral ground connection being electrically connected with the slider body and with only one of the first and second heater element lead pads.

The invention allows a grounded heater element to be employed, while also allowing a decision of whether the slider is to be an "up" slider or a "down" slider to be made in a late stage in the formation of the slider. The slider includes electrical contact pads for making electrical connection with the heater element. The slider also includes a dedicated ground path formed on the slider body at a location that is removed from either of the first and second contact pads, ground path providing electrical connectivity to the slider body. At a late stage in the manufacture of the read and write head, a determination can be made as to which contact pad is to be a ground pad, and that pad can be electrically connected with the ground path.

Allowing the decision of which contact pad is to be a grounded contact pad to be made at a late stage in the manufacturing process, greatly improves yield efficiency. For example, if yield losses result in a shortage of down sliders, the wafer processing can be configured to make the slider a down slider. In this way no wafers are wasted.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIGS. 7(a-c) are cross sectional views of electrical connections at pad locations through a head build.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
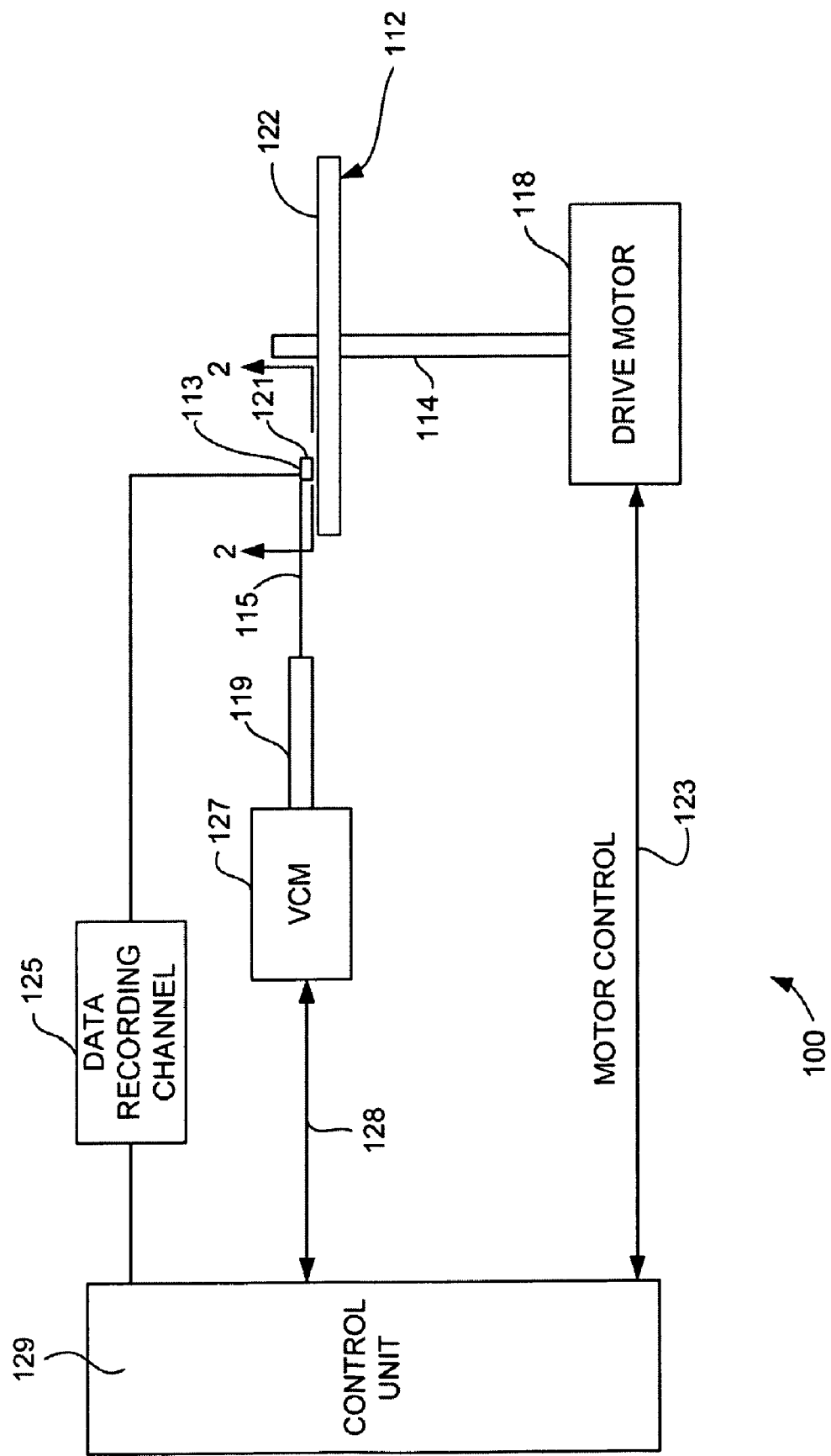
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
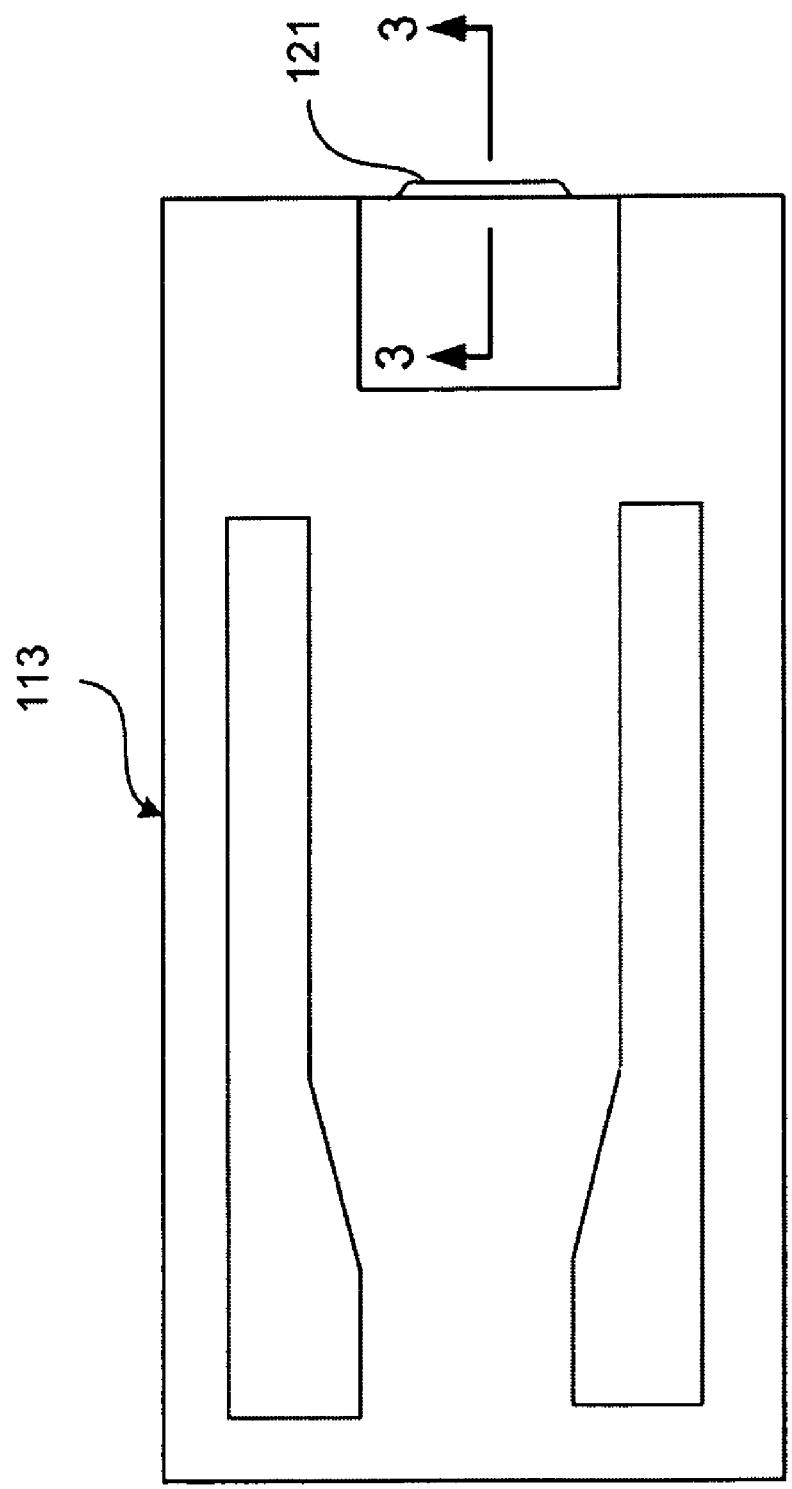
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
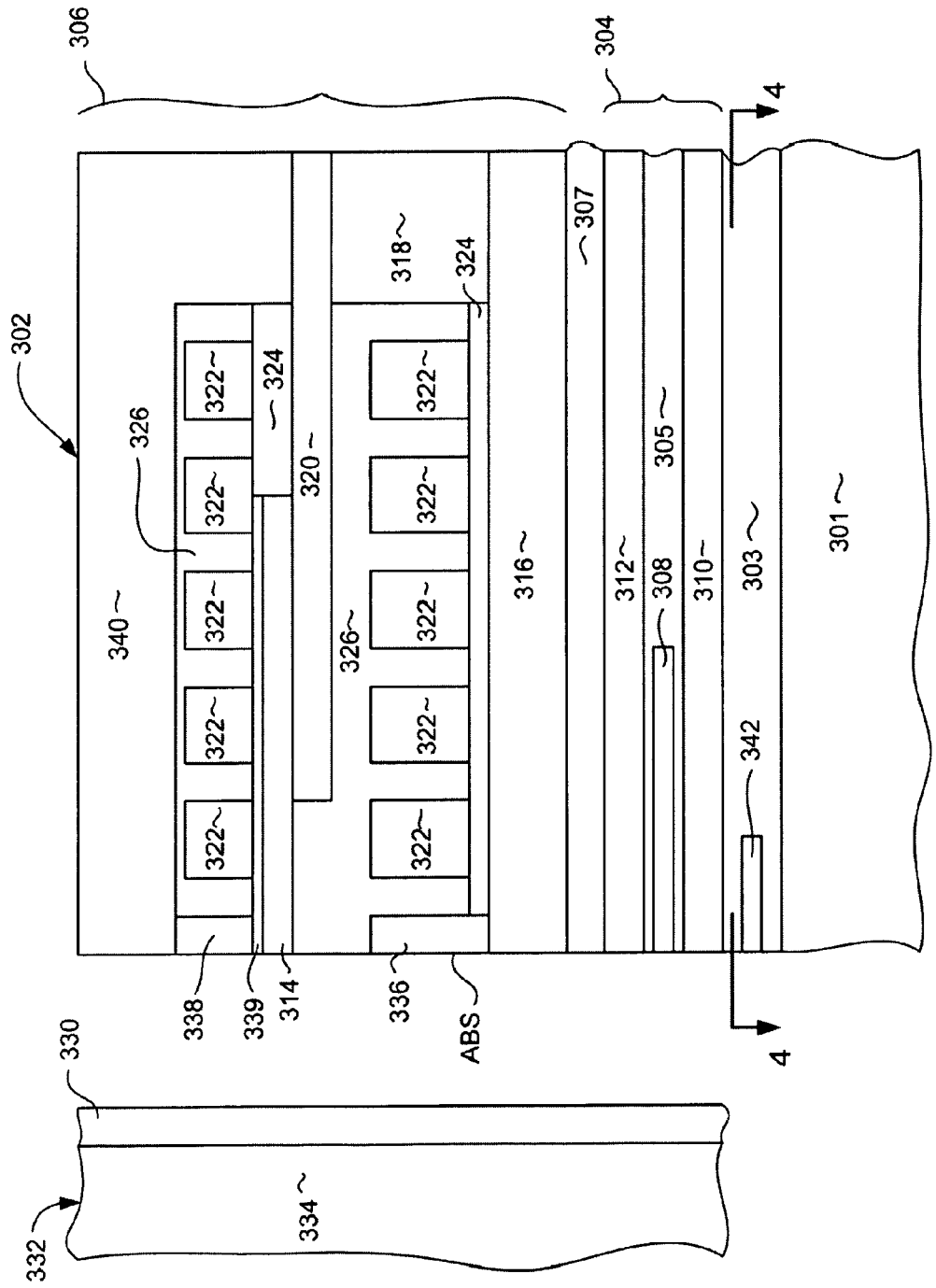
FIG. 3 is a cross sectional view of a magnetic head, taken from line 3-3 of FIG. 2 and rotated 90 degrees counterclockwise, of a magnetic read/write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor, which can be surrounded by an insulation layer 305. The magnetoresistive sensor 308 is located between first and second magnetic shields 310, 312. An insulation layer 307 can also be provided between the read head 304 and write head 306, and can be formed of a material such as alumina.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314. A magnetic pedestal 336 can be provided at the ABS, and attached to the leading return pole 316 to act as a magnetic shield to prevent stray field from the write coil 322 from inadvertently reaching the magnetic media 332.

In order to increase write field gradient, and therefore, increase the speed with which the write head 306 can write data, a trailing, magnetic shield 338 can be provided. The trailing, magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. The non-magnetic trailing gap layer 339 can be constructed of a material such as Rh, Ir or Ta.

As mentioned above, the magnetic head 302 should fly as close as close as possible to the magnetic media 330, without actually contacting the media 330 (i.e. "crashing"). The magnetic signal from the media 330 and magnetic write field from the write head 306 decrease exponentially with increasing distance between the media 330 and the head 302. Thermal fly height modulation can be used to control and minimize the spacing between the media 330 and the read and write heads 304, 306. To this end, a heater 342, such as a resistive heater, can be placed within the head 302. As shown in FIG. 3, the heater 342 is located between the read head 304 and the substrate or slider body 301. However, the heater 342 could be located at some other location within the head 302. In order to decrease the spacing between the media 330 and the read and write heads 304, 306, the heater can heat the read and write heads 304, 306. This heating results in a thermal expansion of the read and write head 304, 306, which cause the read and write head 304, 306 to protrude at the ABS. If the read and write heads 304, 306 come to close to the media 330 (so that they risk contacting the media), the amount of thermal protrusion of the read and write heads 304, 306 can be reduced by reducing the heating provided by the heater element 342. The heater element 342 can be formed on or embedded in an insulation layer 303, which can be, for example, alumina.

Although only one slider is shown in FIG. 1, a disk drive system can include many disks and many sliders. In addition, each surface of the disk 112 (upper and lower surface) is capable of recording data. Therefore, some sliders will be manufactured to be "up" slider, designed to face upward to record the bottom surface of the disk 112, whereas other sliders will be "down" sliders designed to record a top surface of the disk. Because of unpredictable situations, such as yield variance it would be desirable to determine as late in the manufacturing process as possible whether a given set of sliders, manufactured on a wafer, will be "up" sliders or "down" sliders. For example, if yield losses or other manufacturing inconsistencies result in a shortage of "down" sliders, but an abundance of "up" sliders, it would be desirable that the "up" sliders by useable as "down sliders in order to minimize manufacturing cost.

Figure 4:
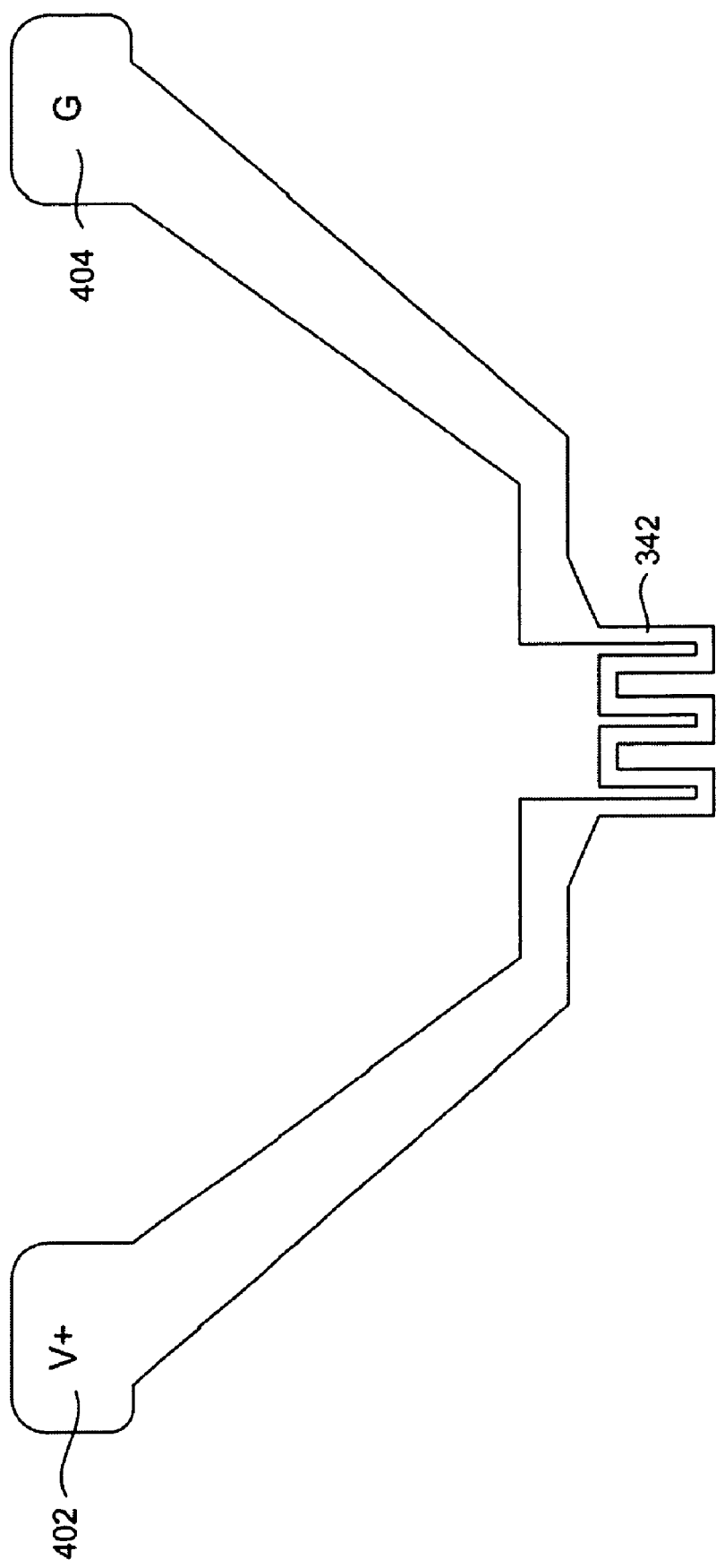
FIG. 4 is a top down view of a heater element, as viewed from line 4-4 of FIG. 3.

A feature that has hindered the interchangeability of sliders has been the electrical connection of the heater element 342 via lead pads to arm electronics circuitry. In a grounded heater design, one lead of the heater element is connected to ground through the arm electronics and is also grounded to the slider body. The other lead of the heater element is connected via arm electronics to a voltage source. For example, FIG. 4 shows a heater element 342 with a grounded lead pad 404 on the right and a voltage lead pad 402 on the left. Because the grounded lead pad 404 is grounded to the slider body, various electrical connections must be made through the entire read/write head manufacturing build so that the ground pad 404 an be connected with the slider body which corresponds with the substrate 301 in FIG. 3. In the past this has meant that the decision of which heater lead pad (i.e. right or left) was to be the grounded pad, had to be made at the very beginning of the build process. Therefore, up/down neutrality of the heads manufactured on a wafer was lost at the very beginning of the build process.

Figure 5:
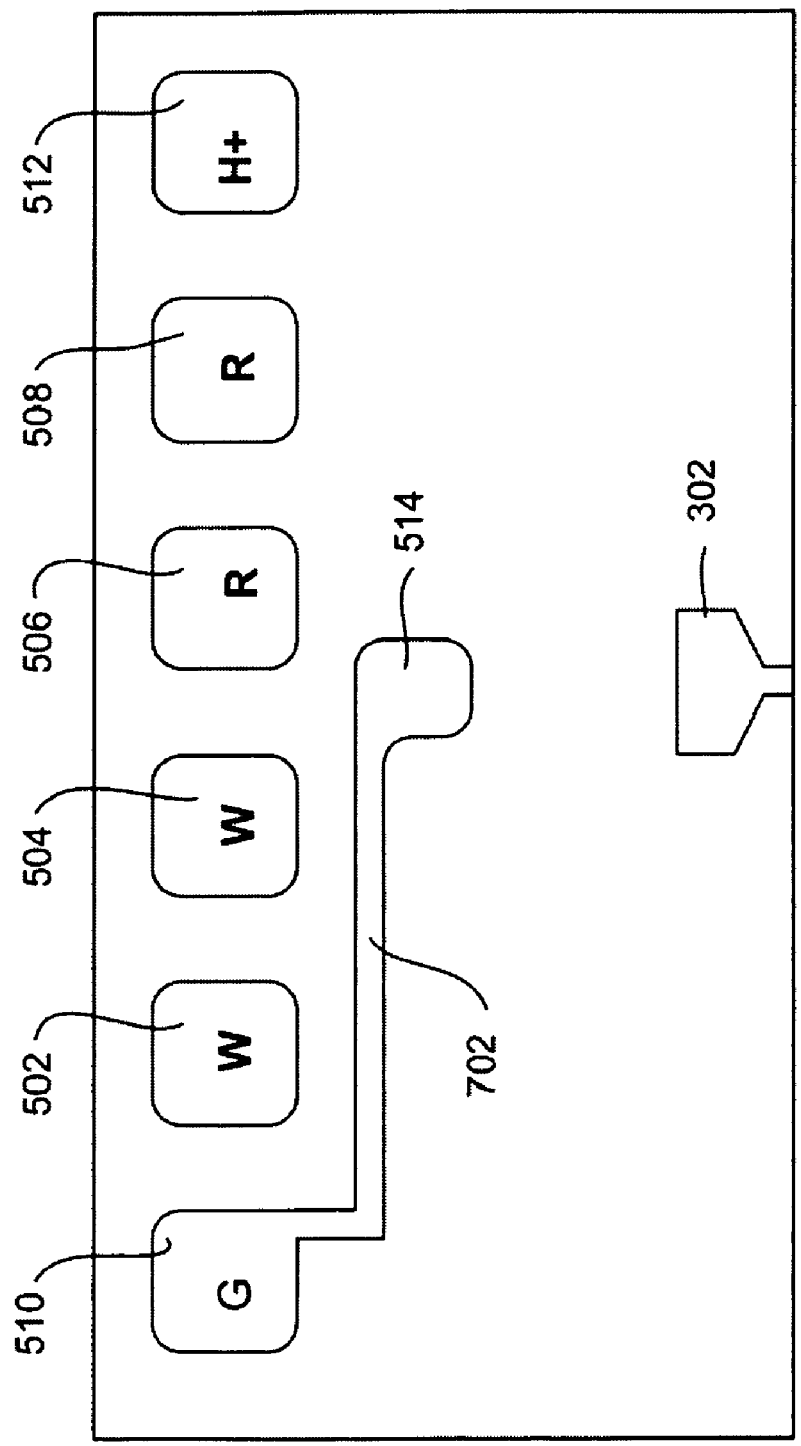
FIG. 5 is an end view of an "up" slider with lead pads.
Figure 6:
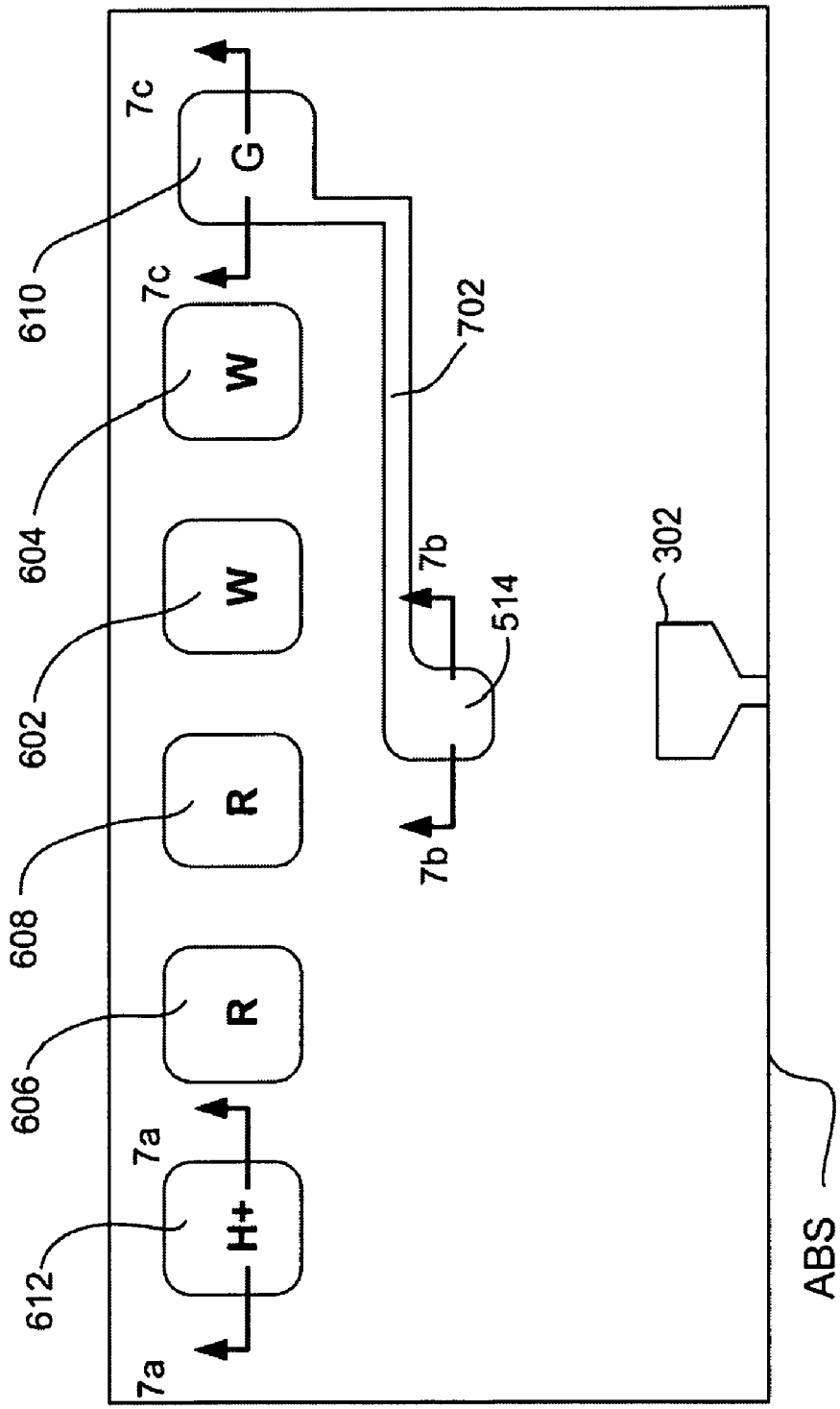
FIG. 6 is an end view of a "down" slider with lead pads.

The present invention overcomes this limitation, allowing the decision of whether a slider will be an up slider or down slider to be made near the very end of the manufacturing process, even when the heater element is grounded to the slider body. FIGS. 5 and 6 shows views of a trailing end of a slider, where FIG. 5 can be, for example an "up" slider, and FIG. 6 shows a "down" slider. FIG. 5 shows a pair of writer bonding pads 502, 504 formed to the left and a pair of read element bonding pads 506 508 to the right. A grounded heater element bonding pad 510 is located at the far left, and a voltage supply heater element bonding pad 512 is located at the far right.

As can be seen, in FIG. 6, the "down" slider has the order of bonding pads reversed so that proper connection can be made with arm electronics when the slider is in the opposite orientation relative to that of FIG. 5. Therefore, FIG. 6 shows a pair of write element bonding pads 602, 604 to the right, and a pair of read element bonding pads 606, 608 to the left. In addition, the grounded heater element bonding pad 610 is to the right and the voltage supply heater element bonding pad 612 is to the left.

As mentioned above, in prior art beads employing grounded heater element bonding pads, the decision of which pad 510, 512 would be the grounded pad had to be made at the beginning of the build process. The present invention, however allows this decision to be put off until the point at which the bonding pads themselves are defined, by providing an up/down neutral grounding path 514, located in a region removed from the other bonding pads 502-512 in FIG. 5 and 602-612 in FIG. 6.

The construction and usefulness of this up/down neutral grounding path 514 can be better appreciated with reference to FIGS. 7a-7c, which show cross sectional views as taken from lines 7a-7a, 7b-7b and 7c-7c in FIG. 6. Because various layers of the read and write head (discussed above with reference to FIG. 3) are electrically conductive they can be used to provide conduction paths for the lead pads. These materials can be deposited in the same deposition and patterning steps as are used to define these various layers in the read and write head. Therefore, in FIGS. 7a-c layers that correspond to layers of the write head in FIG. 3, will be numbered with the same number but with a suffix a, b, or c in FIGS. 7a, 7b, and 7c.

In FIG. 7a, the voltage supply heater element contact pad 612 can be constructed in the same deposition step as the top coil layer 322 (FIG. 3) and so is given the additional designation 322a. The layer 342a corresponds to the heater element 342 in FIG. 3 and also to the heater element pad 402 in FIG. 4. Electrical connection between the layer 322a (lead pad 612) and 342a (the heater element pad 402) is made through the various layers 320a, 318a, 316a 312a, 310a. It can also be seen that, at this location, the heater element layer 342a is not electrically connected to the substrate 301a (i.e. the slider body).

Similarly, at the location of the grounded heater element lead pad 610, connection is made between the pad layer 322c and the heater element layer 342c through the various layers 320b, 318c, 316c, 312c, 310c. Although this is the grounded lead pad 610 for the heater element, these layers are not directly connected through to the substrate 301c at this location.

By contrast, it can be seen that in FIG. 7b, the layer 342, is directly electrically connected with the substrate 301b, through an opening in the insulation layer 303b. Therefore, the layer 322b is directly electrically connected to the substrate through layers 320b, 318b, 316b, 312b, 310b and 342b. Although, either pad 612 (FIG. 7a) or 610 (FIG. 7c) could be used as a ground pad (because neither is connected directly to the substrate 301) connecting one of the pads 610, 612 makes that pad directly grounded to the substrate. In the example shown in FIGS. 7a-c it is desired that the right pad 610 be the ground pad. Therefore, this pad 610 is electrically connected with the neutral ground path pad 322*b* by an electrical connection 702. This connection 702 can be seen more clearly with reference back to FIG. 6.

Therefore, it can be seen that the choice of which pad 610, 612 is to be grounded can be made at a late stage of manufacture, when the layers 322*a-c* are defined. This corresponds to the formation of the upper coil layer 322, which is near the end of the manufacturing process. This advantageously allows the head to be formed as either an up or down bead at a late point in manufacturing. For example, if it turns out that a batch of wafers intended as down sliders ends up having damaged read sensors, another batch that was originally intended to be an up wafer can be changed to be a down wafer at a late point in the manufacturing process to compensate for the loss of down wafers. Therefore, the presence of the neutral grounding path greatly facilitates manufacture and reduces cost.

Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A slider for magnetic recording, comprising:
    a slider body, having an end surface;
    a magnetic head formed on the slider body;
    a heater element formed on the slider body;
    first and second heater element lead pads formed on the slider body, each of the first and second heater element lead pads being connected with a portion of the heater element; and
    an up/down neutral ground connection, located on the end surface of the slider body at a location removed from the first and second heater element lead pads, the up/down neutral ground connection being electrically connected with the slider body and with only one of the first and second heater element lead pads.

2. A slider as in claim 1 wherein the magnetic head includes a magnetic write head and a magnetoresistive sensor and wherein the heater element is located between the slider body and the magnetoresistive sensor.

3. A slider as in claim 1 wherein the magnetic head includes a magnetic write head and a magnetoresistive sensor, the magnetoresistive sensor being located between the write head and the slider body and the heater element being located between the magnetoresistive sensor element and the slider body.

4. A slider as in claim 1 wherein the magnetic head comprises a plurality of electrically conductive layers write head layers, and wherein the electrical connection of the up/down neutral ground connection with the slider body is made by a plurality of electrically conductive layers that are constructed of the same material as the plurality of layers making up the magnetic head.

5. A slider as in claim 1 wherein the magnetic head comprises a plurality of electrically conductive layers write head layers, and wherein the electrical connection of the up/down neutral ground connection with the slider body is made by a plurality of electrically conductive layers that are formed in a common plane with and constructed of the same material as the plurality of layers making up the magnetic head.

6. A slider as in claim 1 wherein the connection of the up/down neutral ground connection with the one of the heater element contact pads determines which of the first and second heater element contact pads will be a grounded contact pad, the other heater element contact pad being a voltage supply contact pad.

7. A slider as in claim 1, wherein the magnetic head includes a write head having a coil layer, and wherein the electrical connection of the up/down neutral ground connection with the one of the heater element contact pads is made by an electrical lead line deposited in the same plane as and of the same material as the coil layer.

8. A slider as in claim 1, wherein the magnetic head includes a write head having a coil layer, and wherein the electrical connection of the up/down neutral ground connection with the one of the heater element contact pads is made by an electrical lead line deposited in a common deposition and photolithographic patterning process as that used to form the coil.

9. A slider for magnetic data recording, the slider comprising:
    a slider body
    a heating element formed on a surface of the slider body;
    a read head formed on the slider, the read head including a magnetoresistive sensor sandwiched between first and second electrically conductive magnetic shields;
    a write head formed over the read head the write head including an electrically conductive, magnetic yoke structure and an electrically conductive coil structure;
    a first heating element contact pad, electrically connected with the heating element through a series of layers deposited in the same plane as and of the same material as the read head and magnetic yoke structure;
    a second heating element contact pad, electrically connected with the heating element through a series of layers deposited in the same plane as and of the same material as the read head and magnetic yoke structure; and
    an electrically conductive grounding path formed on a region of the slider surface removed from the first and second heating element contact pads, the electrically conductive grounding path being electrically connected with the slider body via layers that are formed in the same plane as and of the same material as the read head and magnetic yoke structure; and
    an electrically conductive lead connecting the first heating element contact pad with the electrically conductive grounding path, the electrically conductive lead being formed of the same material and in the same plane as the electrically conductive coil structure.

10. A magnetic head as in claim 9 wherein the first and second heating element contact pads each include a layer of electrically conductive material formed in the same plane as and of the same material as the coil structure.

11. A magnetic head as in claim 9 wherein the first heating element contact pad is a ground contact pad and the second heating element contact pad is a voltage supply contact pad.

12. A magnetic head as in claim 9 wherein the magnetic yoke structure includes a first pole, a back gap and a shaping layer.

13. A method for forming a slider on a wafer, comprising:
    providing a wafer;
    forming a heater element on the wafer, the heating element having leads extending to a first contact pad region and a second contact pad region on the wafer, while forming the heater element on the wafer, forming an electrically conductive material in a ground path region on the wafer, the electrically conductive material in the ground path region being electrically connected with the wafer;

forming a read head, while forming the read head, also forming electrically conductive layers in the first and second contact pad regions and in the ground path region;

forming a write head structure, while forming the write head structure, forming electrically conductive layers in the first and second contact pad regions and in the ground path region;

making a determination of whether the slider is to be an up slider or a down slider, and based on this determination, selecting one of the first and second contact pad regions to electrically connect with the ground path region; and forming an electrically conductive lead to connect the selected contact pad region with the ground path region.

14. A method as in claim 13 further comprising forming an electrically conductive coil structure for the write head structure and wherein the formation of the electrically conductive lead is performed in a common photolithographic patterning and deposition process used to form the electrically conductive coil.

15. A method as in claim 13 further comprising, before forming the heating element, depositing an electrically conductive insulation material to electrically insulate the heater element from the wafer.

16. A method as in claim 13 further comprising, before forming the heating element, depositing an electrically insulating material to electrically insulate the heater element from the wafer, the electrically insulating material having an opening in the ground path region to allow electrical connection with the wafer.

17. A method as in claim 13 wherein the forming a write head structure further comprises: forming a first electrically conductive magnetic pole;

forming an electrically conductive back gap structure; and forming a shaping layer.

18. A method as in claim 13 wherein the forming a write head structure further comprises: forming a first electrically conductive magnetic pole;

forming an electrically conductive back gap structure;

forming a shaping layer; and forming a second pole structure.

19. A method as in claim 13 further comprising, simultaneously while forming the electrically conductive coil and the electrically conductive lead, forming an electrically conductive contact pad in the first contact pad region and forming a second contact pad in the second contact pad region.

20. A method as in claim 13 wherein the selected contact pad is a ground pad and the other contact pad is a voltage supply contact pad.

* * * * *